H. H. SOUTHWORTH & F. W. WOLF, Jr.
REFRIGERATING APPARATUS.
APPLICATION FILED FEB. 23, 1912.

1,079,448.

Patented Nov. 25, 1913.

4 SHEETS—SHEET 1.

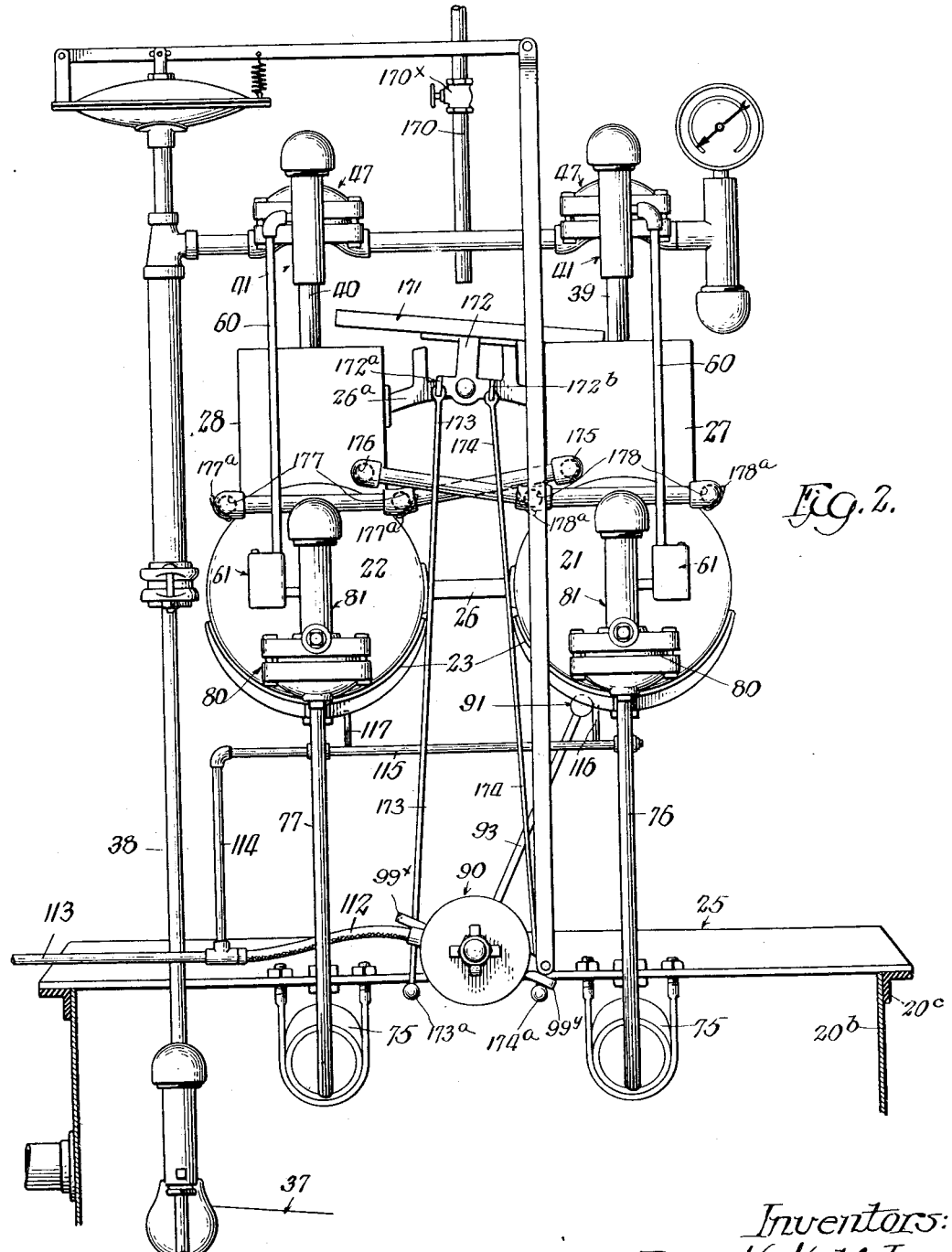

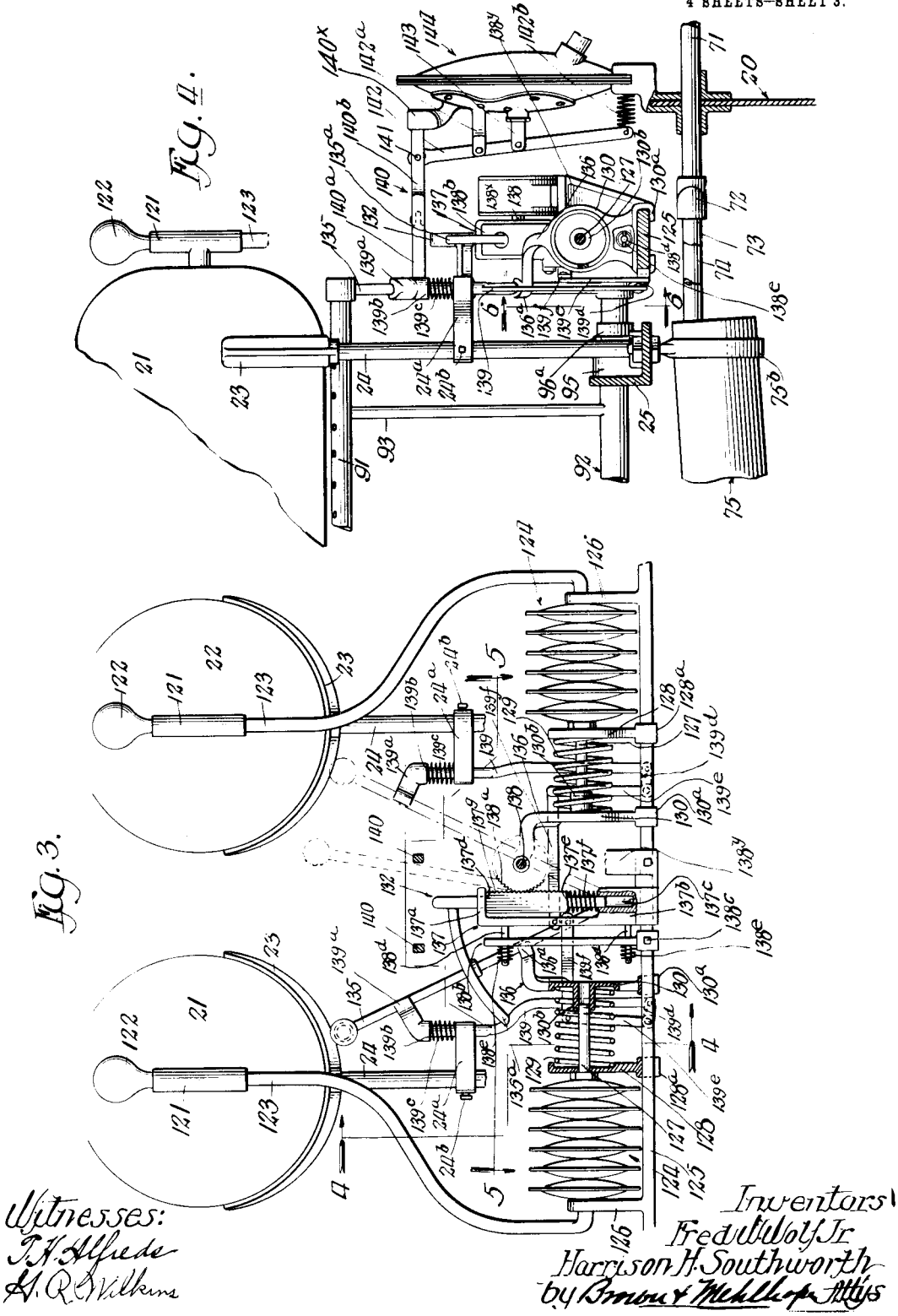

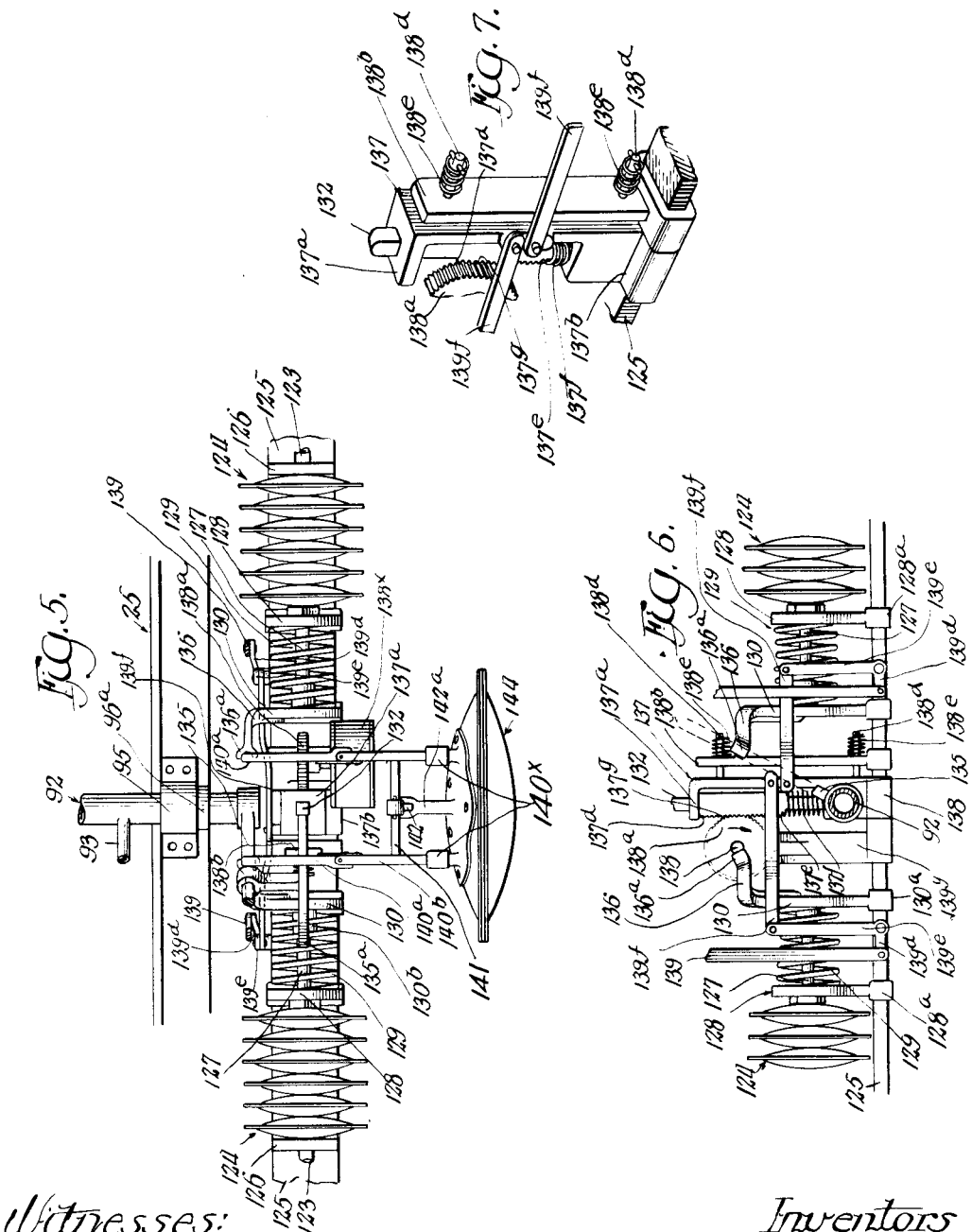

UNITED STATES PATENT OFFICE.

HARRISON H. SOUTHWORTH AND FRED W WOLF, JR., OF CLEVELAND, OHIO, ASSIGNORS, BY MESNE ASSIGNMENTS, TO CLARENCE E. MEHLHOPE, OF CHICAGO, ILLINOIS.

REFRIGERATING APPARATUS.

1,079,448. Specification of Letters Patent. Patented Nov. 25, 1913.

Application filed February 23, 1912. Serial No. 679,315.

*To all whom it may concern:*

Be it known that we, HARRISON H. SOUTHWORTH and FRED W. WOLF, Jr., citizens of the United States, and residents of Cleveland, in the county of Cuyahoga and State of Ohio, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in automatic refrigerating apparatus of the absorption-type and consists of the matters hereinafter described and more particularly pointed out in the appended claims.

The apparatus is of the general type described in an application heretofore filed by us on the first of March, 1911, Serial Number 611,560, and in an application filed by us on the 29th day of January, 1912, and bearing Serial No. 673,972.

In the type of refrigerating apparatus to which our invention relates, generator absorbers are provided in pairs, each containing ammonia liquor. Each generator absorber passes through cycles of generation and absorption in alternation, the one acting as a generator while the other acts as an absorber. Discharge conduits lead from each generator absorber and are connected to a liquid condenser and receiver from which the liquid ammonia is discharged by a suitable valve into a set of refrigeration coils, wherein it vaporizes and expands and is then returned by suitable conduits connected to that one of the generator absorbers, which is absorbing. Means is provided for alternately heating and cooling the generator absorbers, the heating means acting to heat that generator absorber which is generating until the liquor therein has been reduced to a certain stage of weakness and the cooling means acting to cool the other generator absorber, so that it acts as an absorber until the liquor therein has reached the predetermined degree of saturation at which the apparatus is designed to work.

The important feature of an apparatus of this kind is a controlling mechanism to terminate the action of the generator as such when a predetermined temperature of the liquor contained therein has been reached and to continue the action of the absorber at least until such a time as the predetermined pressure of the strong liquor therein has been reached. The degree of saturation or the amount of ammonia gas that a given amount of water will contain is dependent upon temperature and pressure, so that other things being equal, it is possible to substantially predetermine the temperature at which the generator will have driven off an amount of gas so as to reduce the liquor therein to a certain stage of weakness, and similarly to substantially predetermine the pressure in the absorber that must be reached or passed in order that the liquor therein shall attain a certain degree of saturation or strength. The predetermined temperature indicating that the liquor in the generator has been reduced to the intended stage of weakness, and the predetermined pressure indicating that the liquor in the absorber has reached the intended strength or degree of saturation, may be obtained simultaneously, but more often they are separated by a longer or shorter interval of time and the absorber will usually continue as such for some time after the generator has finished its work. Under other circumstances the predetermined pressure in the absorber may be reached and passed before the generator has reached the predetermined temperature. It is therefore necessary that the controlling mechanism which reverses the cooling and heating means at the end of one cycle and at the beginning of the next cycle of the operation of the apparatus, shall act to turn off the heat from the generator, when the temperature therein has reached a predetermined point, that is to say, when the intended amount of gas has been driven off and the liquor therein has reached the intended stage of weakness, but that said controlling means shall not act to shift the heating means to the other generator absorber while it is being cooled and not until after it has completed its cycle as an absorber, when the heat that should be applied to the generator absorber which has been absorbing and the cooling means shifted directly from the generator absorber which has been absorbing to the generator absorber which has been generating.

Various means or motor devices for operating the controlling mechanism may be used but the times at which the motor devices must be brought into operation must be determined by means which are dependent for their operation upon factors denoting on the one hand that a predetermined temperature has been reached in the generator and on the other hand that a predetermined pressure has been reached in the absorber.

We have found that, given a certain size of generator absorbers containing predetermined amounts and strength, respectively, of strong and weak liquor, and a burner or other heating means having a certain heating capacity, it is possible to determine with substantial certainty the time required to heat the generator absorber to the temperature necessary to drive off the required amount of ammonia gas and thus reduce the liquor therein from the given degree of saturation or strength to the intended degree of weakness, and in our present invention we make use of a time controlled device as the determining factor to time the operation of the heat controlling mechanism in so far as it acts to terminate the application of heat to the generator absorber which is generating, relying, as in the applications hereinbefore referred to, upon a predetermined high pressure in the generator absorber which is absorbing corresponding to the intended degree of saturation therein, the time for acquiring which is more indeterminate, for determining the point for bringing into action the power mechanism which finally applies the heating means to the generator absorber which has been absorbing and for shifting the cooling means to the generator absorber which has been generating, so as to reverse the cycle of the two generator absorbers.

In the drawings—Figure 1 is a view representing an automatic absorption refrigerating apparatus of the kind referred to above, provided with our improvements; Fig. 2 is a view representing the upper part of said apparatus in front elevation on an enlarged scale; Fig. 3 is a view representing a partial rear end sectional elevation of the apparatus indicated by line 3—3 of Fig. 1; Fig. 4 is a view representing a section through the apparatus on a plane indicated by the broken line 4—4 of Fig. 3; Fig. 5 is a view representing a partial horizontal section through the apparatus in a plane indicated by the broken line 5—5 of Fig. 3; Fig. 6 is a view representing a partial section of the parts shown in Fig. 4 on the line 6—6 thereof; Fig. 7 is a detail perspective view showing parts to be referred to more particularly later.

Referring now to that embodiment of our invention illustrated in the drawings, in which the main features of the apparatus except in the respect hereinbefore referred to are identical with the apparatus, as shown in the second-named application, similar reference numerals being in many cases used for convenience of comparison, 20 indicates an open tank which constitutes a supporting base for the apparatus and which is adapted to contain cooling water for the liquid ammonia condenser and receiver, which is located within said tank. Said tank has a bottom wall 20$^a$, and a vertical wall 20$^b$. At the top of said vertical wall is provided a flange 20$^c$ which, in the present instance, is formed by means of an angle iron extending about and secured to the vertical wall 20$^b$ at its upper edge.

21, 22 indicate parallel, longitudinally extending closed metal drums, each constituting a generator-absorber and being constructed to contain aqua-ammonia. Said drums extend parallel to and at each side of the longitudinal central axis of the tank 20 and are located entirely within a horizontal projection of said tank. They are supported above said tank in any convenient manner, and as shown in the drawings, each rests in longitudinally spaced saddles 23, 23 carried at the upper ends of upright bars 24, 24 that bear upon and are rigidly secured to transversely extending angle bars 25, 25 bolted to the flange 20$^c$, at the upper edge of the tank 20. Spaced brackets 26 located between and secured at their ends to the drums 21, 22, serve to hold the drums in spaced relation and to brace the supporting structure.

To the top of each drum 21, 22 is secured an open top, water-tight box or tank 27, 28, respectively, said boxes or tanks extending substantially the entire length of said drums. Said tanks are adapted for containing cooling water and their bottom walls are each preferably provided by the top wall of the associated drum.

37 indicates the condenser-receiver coils which, as illustrated herein, are located within the main tank 20 and rest upon blocks supported on the bottom 20$^a$ thereof. An upright pipe 38 at its lower end leads to the upper end of the liquid receiver coil 37 and said pipe connects at its upper end with pipes 39 and 40 which are each connected with one of the pipes 32, through which the ammonia gas is discharged from the generator-absorbers 21, 22 respectively. Check-valves are interposed in each of the connections between said pipes which will permit the flow of ammonia gas toward the liquid receiver coils 37 but which will prevent a back-flow therefrom. As shown herein and to provide against possible leakage, two check-valves 41 and 47 are interposed in the connection between each pipe 39, 40, leading from the generator-absorbers and the pipe 38 leading to the liquid ammonia receiver.

As it is very difficult to provide check-valves that are incapable of a slight leakage, we provide the double system of check-valves for each generator-absorber, as above described, and in addition, intermediate said check-valves in each case provide the following mechanism: 60 indicates a by-pass pipe leading from a point intermediate the check-valves 41 and 47 to an absorption or suction pipe 30 located in the associated generator-absorbers 21, 22. A suitable check-valve is preferably provided at 61 to prevent back-flow in said by-pass toward the check-valves 41, 47. Any ammonia gas, which by reason of head pressure from the liquid ammonia receiver coils or from any other source leaks through the check-valve structure 47 and passes in the contrary direction therethrough, will take the path of least resistance down through the pipe 60 into the absorption or suction pipe 30 of the associated drum whence it will escape below the surface of the aqua-ammonia therein by which it will be absorbed.

The connections by which the ammonia gas after it has expanded through the refrigerating coils is conducted to one of the absorption or suction pipes 30, located in one or the other of the generator-absorbers so as to be reabsorbed by the liquor contained therein, are as follows: At the rear end of the apparatus is located a scale trap 65 in which is located a screen through which the ammonia gas must pass and which will retain any scale that would otherwise be carried into the apparatus from the refrigerating coil, and tend to interfere with the operation of the check-valves.

A pipe 71 leads from the scale-trap 65 and is connected by a T-fitting 72 to pipes 73, 74—one for each generator-absorber. Said pipes, as shown herein, are respectively connected by traps 75, 75 extending under the respective generator-absorbers with upright pipes 76, 77, each of which are connected to an absorption or suction pipe 30 in the associated generator-absorber. Check-valves 80 and 81 are interposed in the connection between each pipe 76, 77 and its associated suction-pipe 30. The traps 75 are adapted to arrest any liquor that escapes through the check-valves 80, 81 from the suction pipe of the generator-absorber which is generating and to retain the same until that generator-absorber begins to act as an absorber when said liquor will be returned to said generator-absorber.

The operation of these several devices last described is as follows: When one of the generator absorbers is acting as an absorber, say the generator-absorber 21, the other 22 in the meantime, acting as a generator, the ammonia gas from the refrigerating coil, after passing the trap 65, passes through the pipe 71 to the T-fitting 72 whence it passes through the pipe 73, the associated trap 75 and the pipe 76, leading to the drum 21, whence it has a free, unrestrained passage through said connection, (whereas a passage through the pipe 74, the associated trap 75 and the pipe 77 to the generator-absorber 22 is resisted by the back pressure therefrom due to its action as a generator, which back-pressure acts to hold the associated check-valves 81 and the valve of the valve structure 80 closed).

We now pass to a description of the mechanism for alternately heating and cooling the drums 21, 22 causing them each to alternately act as a generator and then as an absorber. As shown herein, we prefer to use gas for heating purposes and water for cooling purposes, but manifestly, our invention is not limited to or dependent upon such cooling and heating media.

As shown in the drawings, a burner 90 is used for alternately heating the drums. Said burner is hinged to swing about a longitudinally extending, horizontal axis located below and in a vertical plane half-way between the drums 21, 22 so that it may be brought alternately into a position to heat either of the drums. Said burner 90 consists of longitudinally extending parallel, vertically spaced pipes 91, 92, connected together at longitudinally spaced intervals by pipes 93. The upper pipe 91 is plugged at its ends and is perforated on its upper side and constitutes the burner proper. The lower pipe 92 forms a rock shaft on which the burner 90 swings as a whole. Said pipe 92 is rotatively mounted in bearing blocks 94, 95 secured to the transverse angle bars 25 supported on top of the main tank 20 and is held against longitudinal movement by means of collars 96 and 96$^a$ rigidly secured to it adjacent said bearing blocks. The rear end of the pipe 92 is plugged. At its forward end is secured a controlling valve 97 which controls the feed of fuel gas to the burner.

When the burner pipe 91 is under either of the drums 21, 22, a free passage for the fuel gas is provided through the valve 97 to the burner; but at any intermediate position of the same the valve will act to cut off the supply of gas to the burner. Gas is supplied to the valve 97 by means of a flexible pipe 112 (see Fig. 2) which leads from a fuel gas supply pipe 113.

114 indicates an upright pipe leading from said supply pipe 113 to a horizontal pipe 115 below and at the forward ends of the drums 21, 22 and connected with pilot burners 116, 117 so located that they will light the burner 90 when it is at either limit of its movement under and in position to heat either of the generator-absorbers.

The power mechanism for throwing the burner, as shown herein, is as follows: In each drum 21, 22 is located a pipe preferably located at the bottom of the drum and extending a short way therethrough. Said pipe is closed at its end in the drum and is led out through an aperture in the rear end wall of the drum in which it is secured by means of a gas tight joint. The pipes contain a fluid adapted to be readily affected by changes of temperature and in the present instance contains water. Said pipe in each case is connected with a T-fitting 121 which is closed at its upper end by a hollow dome or ball 122, and at its lower end is connected to a pipe 123 which leads to a mechanical expansion device, in this case, a metallic bellows 124 which is adapted to elongate and shorten in accordance with the pressure developed therein. When the water in said pipe is heated, steam is generated, thus developing pressure in the pipe 123 and the bellows 124 which causes said bellows to expand.

The bellows 124, 124 are supported on a horizontal bar 125 rigidly secured to the rear end of the tank 20. Each bellows is secured to and bears at its outer end against a fixed upright bar 126 rising from said horizontal bar 125. The inner end of the bellows is provided with a rigid horizontal stem 127 and with a fixed collar or cup 128 at the base of said stem which forms a seat for one end of a coiled spring 129 the other end of which seats in a second cap or cup 130 spaced from the first. Said cups 128 and 130 have bases respectively 128$^a$ and 130$^a$, which have sliding bearing on the horizontal bar 125. The cup 130 has a centrally located sleeve 130$^b$ in which the inner end of the stem 129 has sliding bearing.

135 indicates a bar at the rear end of the burner 90 rigidly connected at its ends respectively with the burner pipe 91 and with the rock-shaft pipe 92. Said bar is provided intermediate its ends with an arcuate detent member 135$^a$ having opposite ends arranged to travel in a path into which the upper end of a vertically reciprocable rod 132 normally projects. When the burner is in position to heat the drum 21, for example, the detent member 135$^a$ is engaged against the upper end of the rod 132 on the side adjacent said drum.

The spring retaining cup 130 at the inner end of the spring 129 has an arm 136 with a forked end 136$^a$ which is adapted for engagement with the bar 135. When the burner 90 is in heating position under the drum 21, for example, (see Fig. 11) the forked end of the arm 136 of the associated spring retaining cup 130 engages the bar 135 at the rear of the burner and said bar is held against movement by reason of the engagement of its detent member 135$^a$ with the vertically reciprocable spring controlled rod 132. As the burner heats the drum 21, the rise in temperature communicated to the liquor therein is imparted to the pipe and to the water contained therein, so that steam pressure is developed in the pipe 123 and in the expansive bellows 124, causing said bellows to expand and move the cup 128 toward the right as shown in Fig. 3. As the cap 130 is held against movement by reason of the fact that its arm 136 is engaged against the bar 135 of the burner, which in turn cannot move on account of the engagement of its detent member 135$^a$ against the upper end of the vertically reciprocable rod 132, the movement to the right of the spring retaining cap 128 under the expansive action of the bellows compresses the spring 129 between its two retaining caps, and stores expansive energy in said spring. This continues as long as the rod 132 stands in the way and resists the movement of the arcuate detent member 135$^a$.

Time controlled mechanism is provided to remove the vertically reciprocable rod 132 out of the path of the arcuate detent 135$^a$ of the burner bar 135 at the end of a predetermined time interval which begins at the instant that the heating of the generating drum is begun, said time interval corresponding to the time required to raise said drum to a temperature such that the liquor in said drum will have been reduced to the intended weakness. As shown herein, said reciprocable bar is moved downwardly out of the said path by a clock controlled mechanism as follows: Said bar 132 is reciprocably mounted in an upright standard 137 having at its upper end a laterally extending, apertured arm 137$^a$ through which the upper end of the bar 132 extends and having a base 137$^b$ which is mounted to slide on the horizontal bar 125. Said base 137$^b$ has a vertical socket 137$^c$ in which the lower end of the reciprocable rod 132 has bearing. The intermediate part of the rod 132 is made wider to provide a shoulder 137$^d$ adapted for engagement against the lower side of the arm 137$^a$ at the upper end of the standard and a shoulder 137$^e$ which forms a seat for the upper end of a coiled spring 137$^f$ which bears between said shoulder and the base 137$^b$ of the standard. The tendency of said spring is to hold the bar 132 so that its shoulder 137$^d$ is in engagement with the arm 137$^a$ at the upper end of the said standard.

138 indicates a shaft having a timed movement which may be operated by any suitable clock mechanism as, for example, a clock 138$^x$ supported by a standard 138$^y$ from the bar 125.

138$^a$ indicates a gear-wheel keyed to said shaft and adapted for engagement with a rack 137$^g$ on the adjacent edge of the reciprocable bar 132.

138$^b$ indicates an upright bar adjustably secured to the horizontal bar 125 by means of a set-screw 138$^c$, at the left of the standard 137 as it appears in Fig. 3. The standard 137 is provided with laterally extending horizontal pins 138$^d$ which project through suitable bearing apertures in the upright rod 138$^b$.

138$^e$ indicates coiled springs mounted on said pins and bearing between parts fixed to said pins and the side of the standard 138$^b$ which is farthest removed from the standard 137, said springs tending to pull the standard 137 and with it the reciprocable bar 132 away from the shaft 138 so as to disengage the rack 137$^g$ from the gear wheel 138$^a$.

On each of the uprights 24 that support the rear saddle 23 in which the generator absorber drums rest are secured laterally extending bars 24$^a$ by means of set-screws 24$^b$. Said arms project toward a plane intermediate said drums and have at their adjacent ends vertical apertures through which extend upright buffer bars 139 each having a bifurcated inwardly directed inclined arm 139$^a$ that stands at the end of the path of the burner bar 135 and is adapted to be struck by said bar when the burner reaches heating position below the associated drum. The buffer bars each have a shoulder 139$^b$ above the associated bar 24$^a$ and a coiled spring 139$^c$ is interposed between said shoulder and bar adapted to hold said buffer bar in its highest position. The buffer bars 139 are extended down to the bar 125 and are there each pivoted to a horizontal arm 139$^d$ of a bell-crank lever having an upright arm 139$^e$. The bell-crank levers are pivotally supported on the bar 125 and their upright arms 139$^e$ are each connected by a horizontal link 139$^f$ to the standard 137.

The operation of the time controlled mechanism is as follows: Consider the parts of the apparatus in the position shown in Fig. 3 with the burner in position to heat the drum 21 and with such heating just beginning. The burner is locked in this position by reason of the engagement of its arcuate detent 135$^a$ against the left face of the vertically reciprocable rod 132. As the temperature of the drum 21 rises, the bellows 124 expands and energy is stored in the coiled spring 129 which tends to throw the burner 90 toward the right, that is to say, toward heating position under the drum 22. In the meantime the time controlled shaft 138 rotating counter clockwise through the gear wheel 138$^a$ and the rack 137$^g$, acts to gradually lower the vertically reciprocable rod 132 against the upward tendency of its coiled spring 137$^f$. This continues until at the end of a certain time interval (empirically predetermined and corresponding to the length of time required to reduce the liquor in the drum to the desired weakness under the working conditions of the particular apparatus), the top of the rod 132 drops below the lower edge of the arcuate detent 135$^a$, thus releasing said detent and with it the burner bar 135, whereupon said bar is immediately thrown toward the right by the arm 136 under the stored energy of the spring 129. As soon as the rod 132 drops below the arcuate detent 135$^a$ the standard 137 which carries said bar is withdrawn to the left by the springs 138$^e$, thus disengaging the rack 138$^g$ from engagement with the gear wheel 138$^a$. The continued rotation of the time controlled shaft 138 thus has no further effect to depress the rod 132 which is held with its upper end in engagement with the lower edge of the arcuate detent 135$^a$ by its spring 137$^f$.

As will presently appear the burner 90 may be shifted at once to heating position under the drum 22 or may be held in an intermediate unbalanced position ready to fall by gravity into said heating position. In either case, when it does come to heating position under the drum 22, the burner bar 135 strikes the inclined arm 139$^a$ of the buffer-bar 139 associated with said drum and as it does so the left hand end of the arcuate detent 135$^a$ is withdrawn from the path of the vertically reciprocable bar 132, which at once, under the action of its spring 137$^f$, rises and engages against said end of the arcuate detent so as to lock the burner in position under the drum 22. The jar provided by the bar 135 striking said buffer arm, causes a depression of the buffer bar which acts to swing the upright arm 139$^e$ of the associated bell-crank lever toward the right thus through the associated link 139$^f$ drawing the standard 137 to the right so as to bring the rack 137$^g$ again into engagement with the gear wheel 138$^a$. The said rack-and-pinion then remain in engagement until the predetermined time interval has elapsed, when the arcuate detent is again released, the rack released from the time controlled ratchet and the burner shifted back toward the drum 21, when the action above described is reproduced in connection with the drum 21.

As has been said, the burner when first shifted from the drum which has been generating toward the generator which has been absorbing, does not necessarily at once reach the said position under the other drum by reason of mechanism now to be described, but does pass into a position beyond a neutral position such that its weight will, when the burner is released, cause it to automatically travel to said position under the other drum.

At each side of a vertical plane half way between the generator absorbers and located in the path of the movement of the burner rod 135 are located horizontal spaced reciprocable catches 140, 140, which project into the path of the burner bar 135. Said catches are each made in two parts 140$^a$, 140$^b$, so connected together that the parts 140$^a$ may freely swing toward each other but are locked against movement in a direction away from each other. The parts 140$^b$ have sliding bearing in brackets 140$^x$ supported by the diaphragm casing 144. Said catches are connected together by means of a horizontal bar 141 which is operated upon by the upper end of a lever 142 fulcrumed to a lug 142$^a$ projecting from a diaphragm casing 144 and connected below said fulcrum to a stem 143 projecting from said casing and rigidly connected to a diaphragm contained therein. The lower end of said lever 142 is connected by a spring 142$^b$ to the casing 144 which spring normally holds said lever in such position that the catches 140, 140, actuated thereby project into the path of the burner rod 135. The diaphragm casing is connected by a fitting 146 with the chamber 65$^a$ in the scale trap, which, as has been described, is connected with both of the generator absorbers and in which is contained ammonia gas at a pressure equal to the back pressure exerted by the generator absorber which is acting as an absorber.

The tension of the spring 142$^b$ is so adjusted that when the pressure in the scale trap has reached a certain point corresponding to a carefully predetermined back pressure in the generator absorber that is acting as an absorber, indicating a certain saturation of the liquor therein, the pressure against the diaphragm will cause its stem 143 to swing the lever 142 so as to withdraw the catches 140 out of the path of the burner bar 135.

When the burner is shifted under the action of the bellows 124 as heretofore described, due to the heat generated in the drum which is acting as a generator, it first strikes the nearest catch 140 and, swinging the forward part 140$^a$ of said catch out of the way, strikes the second catch which arrests it just after the burner has passed through a neutral position. Should the liquor in the drum which is absorbing have not yet reached the predetermined degree of saturation, the burner will stand in this position until such point of saturation has been reached when the pressure due to such saturation, acting upon the diaphragm in the casing 144, will act to withdraw said catch 140 from the path of the burner rod whereupon the burner will fall to its position below the drum which has been acting as an absorber.

As shown in the drawings herein, water is used as the cooling medium for alternately cooling and heating the generator absorbers. The supply of cooling water is controlled as follows:

170 indicates a pipe or conduit (see Fig. 2) connected with any suitable source of water supply and is provided with a hand-valve 170$^x$. Said pipe is located above and substantially midway between the tanks or boxes 27, 28, which are located on the generator absorbers 21, 22, respectively.

171 indicates a trough carried at the upper end of a rocking support 172 which has pivotal connection with a bracket 26$^a$ that braces the boxes apart and which has two upright lugs which act as stops or rests to engage the bottom of the trough 171 in either of its two positions, in one of which it directs water into the box 27 and in the other of which it directs water into the box 28. The rocking support 172 is provided with rock-arms 172$^a$, 172$^b$.

173, 174 indicate depending links pivotally connected at their upper ends to the rock-arms 172$^a$, 172$^b$, respectively. The burner 90 has radially extending, slotted rock-arms 99$^x$, 99$^y$, through which extend the links 173, 174, respectively, which are provided with lugs 173$^a$, 174$^a$, at their lower ends that are adapted for engagement against the lower sides of said rock-arms 99$^x$ and 99$^y$.

The operation of this mechanism is as follows: The trough 171 as shown in Fig. 2 stands in a position to direct the cooling water into the box on the drum that is being heated, that is to say, as shown in the said figure, into the box 27 on the drum 21. In this position of the trough 171, the lug 174$^a$ on the link 174 adjacent the box 27 is in contact with the rock-arm 99$^y$ of the burner 90 while the lug 173$^a$ on the other link 173 is in a position spaced below the rock-arm 99$^x$ of said burner. When, at the end of the predetermined time interval, the burner 90 is rotated until the burner rod 135 strikes the catch 140 farthest removed from it and is arrested thereby, the rock-arm 99$^x$ is rotated toward the lug 173$^a$ on the link 173, but its movement is arrested short of its striking said lug. When, under the action of the back pressure in the diaphragm casing 144, the catch 140 is withdrawn from the path of the rod 135, the weight of the burner causes it to rotate into heating position below the drum 22, and with it the rock-arm 99$^x$, the rock-arm 99$^x$ in the last part of its movement strikes the lug 173$^a$ on the link 173 and pulls down on said link so as to shift the rocking frame 172 into a position such that the trough carried thereby will direct the cooling water into the box 28 above the drum 22. The apparatus in this respect is identical with that shown in the second named application hereinbefore referred to.

At the forward ends of the boxes 27, 28, near their bottoms are located outlet pipes 175, 176, respectively, which are connected with longitudinally extending pipes 177. 177, and 178, 178, located at each side of the bottoms of the boxes 27, 28, respectively. The pipes 177 and 178 are provided with lines of perforations adapted to direct the water against the respective drums and troughs 177ª and 178ª are provided below said pipes to aid in properly directing the water flowing from said apertures so that it will flow downwardly in contact with said drums.

The operation of the apparatus as an entirety, will be readily understood from the previous description.

The generator absorbers alternately act as a generator and an absorber, in the one case being heated and in the other case being cooled, and when the end of the cycle of the one which is acting as a generator is reached, which is determined by the time mechanism, the burner is shifted from beneath the generator, the fuel gas supplying the burner being at the same time turned off, and the burner being held in an intermediate unbalanced position until the predetermined pressure has been reached in the absorber, when the burner completes its movement so as to come under the absorber, in which position the fuel gas is again turned on, and the drum which has been acting as an absorber begins to act as a generator. At the same time in the last part of the movement of the burner the trough 171 is shifted so as to direct the water into the tank located above the drum which is now to be heated, from which tank said cooling water after doing its work as a rectifier is directed into the pipes which discharge water against the drum which is now absorbing.

Should in any case the drum which is absorbing, reach or pass the predetermined pressure before the drum which is acting as a generator has been heated for the predetermined time interval, the catches 140 will be withdrawn from the path of the burner rod 135, so that when the burner is shifted it will pass by the catches at once and into the position to heat the drum which has up to that time been acting as an absorber, and at the same time shift the cooling water.

While in describing our invention, we have referred to certain details of mechanical construction and arrangement, it is to be understood that we are not to be limited thereby except as pointed out in the appended claims.

We claim as our invention:—

1. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation, time controlled means for terminating the periods of heating of each generator absorber, and means for applying the heat to the alternate generator absorber and for terminating the application of the cooling means to the said alternate generator absorber, when the pressure therein has reached a predetermined limit, and for simultaneously applying said cooling means to the other generator absorber.

2. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation, time controlled mechanism for terminating the periods of heating each generator absorber, and means for applying heat to the alternate generator absorber, and for simultaneously shifting the cooling means from said alternate generator absorber to the other generator absorber when the pressure in the said alternate generator absorber has reached a predetermined limit.

3. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation, comprising a member adapted to supply heat to either of said generator absorbers, said heat supply member being movable from heating position under one generator absorber to heating position under the other, devices for discharging a cooling fluid against either of said generator absorbers, adapted to be shifted by said heat supply member at a predetermined point in the path of its movement, power means for moving said heat supply member from heating position under one generator absorber toward its heating position under the other generator absorber, time controlled mechanism for determining the instant when said power means shall act, and stop mechanism for arresting the movement of said heat supply member toward the generator absorber which is being cooled when the pressure therein has not reached or passed a predetermined point.

4. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation comprising a member adapted to supply heat to either of said generator absorbers, said heat supply member being movable from heating position under one generator absorber to heating position under the other, devices for discharging a cooling fluid against either of said generator absorbers, adapted to be shifted by said heat supply member in the latter part of its movement, power means for moving said heat supply member from heating position under one generator absorber toward its heating position under the other generator absorber, time controlled mechanism for determining the instant when said power means shall act, a controlling device for cutting off the heat supply intermediate the two final positions of said heat supply member, and stop mechanism for arresting the movement of said heat supply member toward the generator absorber which is being cooled when the pressure therein has not reached or passed a predetermined point.

5. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation including a member adapted to supply heat to either of said generator absorbers, said heat supply member being movable from heating position under one generator absorber to heating position under the other, devices for discharging a cooling fluid against either of said generator absorbers adapted to be shifted by said heat supply member at a predetermined point in the path of its movement, power means for moving said heat supply member from heating position under one generator absorber toward its heating position under the other generator absorber, a time controlled stop adapted to prevent such movement for a predetermined time interval, a second stop mechanism for arresting the movement of said heat supply member toward the generator absorber which is being cooled when the pressure therein has not reached or passed a predetermined point, and means for resetting said time controlled stop at the beginning of each period of heating.

6. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation, comprising a member adapted to supply heat to either of said generator absorbers, said heat supply member being movable from heating position under one generator absorber to heating position under the other, devices for discharging a cooling fluid against either of said generator absorbers, adapted to be shifted by said heat supply member at a predetermined point in the path of its movement, power means for moving said heat supply member from heating position under one generator absorber toward its heating position under the other generator absorber, a stop for resisting the said movement of said heat supply member, clock mechanism for removing said stop from the path of said heat supply member at the end of a predetermined time interval, means for disengaging said stop from operative connection with said clock mechanism when it has been removed from the path of said burner, a second stop mechanism for arresting the movement of said heat supply member toward the generator absorber which is being cooled when the pressure therein has not reached or passed a predetermined point and means for returning said first named stop to its position in the path of said heat supply member and for reëngaging it with said clock mechanism when said heat supply member has reached the end of its path of movement.

In testimony, that we, claim the foregoing as our invention, we affix our signatures in the presence of two witnesses.

HARRISON H. SOUTHWORTH.
FRED W. WOLF, Jr.

Witnesses:
T. H. ALFREDS,
GEORGE R. WILKINS.